Patented Jan. 22, 1952

2,582,965

UNITED STATES PATENT OFFICE 2,582,965

METHOD FOR MODIFYING WHEAT GLUTEN

John Robert Coffman, St. Paul, Minn., assignor to General Mills, Inc., a corporation of Delaware No Drawing. Application September 9, 1949, Serial No. 114,923

7 Claims. (Cl. 260—112)

The present invention relates to a novel wheat gluten product and to a process of preparing it.

Wheat gluten in the presence of water hydrates to an elastic doughy mass, which is a characteristic of this protein which distinguishes it from other commercial proteins and which prevents it from being useful in the applications in which other commercial proteins are useful. The present invention relates to a wheat gluten product which has been modified from the natural characteristics of gluten, such that it is useful in numerous ways in which the unmodified gluten is without utility. Thus, for example, the modified gluten of the present invention has been found to be admirably suited for use as an adhesive and for the stabilization of natural and synthetic rubber latices, uses to which unmodified gluten cannot be put.

The modified wheat gluten of the present invention is obtained by a limited hydrolysis of the gluten in an aqueous medium containing an alkaline earth metal oxide such as calcium oxide, in which the hydrolysis is carried out under carefully controlled conditions within a restricted range.

There are numerous reports in the literature of the hydrolysis of proteins including gluten. However, the hydrolysis of gluten under the conditions herein described and the production of a modified gluten product having the properties described is entirely new. The product thus obtained no longer possesses the elastic doughy characteristics of the unmodified gluten and demonstrates water solubility over the entire pH range. The product is also soluble in various aqueous-organic solvent mixtures, such as 60–70% alcohol or 85% ethylene glycol-monomethyl ether (methyl Cellosolve). The product is an excellent remoistening adhesive having high bond strength, quick grab, and simplicity of application. It is also useful as a protective colloid for stabilizing natural and synthetic rubber latices.

It is therefore an object of the present invention to provide a novel lime hydrolyzed gluten and to provide a process of producing the same.

The hydrolysis of the gluten is effected in an aqueous medium containing lime in a quantity of 2–5% based on the dry weight of the gluten and calculated as CaO. The hydrolysis is effected in an autoclave at a temperature within the range of 145–155° C. preferably at 150° C. and for a time period within the approximate range of 15–60 minutes, preferably 20–30 minutes. While the amount of water present during the hydrolysis is not critical, it is usually found desirable to operate in an aqueous medium in which the gluten is at approximately 20% concentration.

The exact nature of the reaction which takes place is not definitely understood but it involves a partial hydrolysis of the gluten. This is evidenced by an increase in the amino nitrogen content and by a decrease in the amide nitrogen content. This is indicative that amide or peptide bonds are being hydrolyzed, resulting in products of shorter chain length. The hydrolyzed product also demonstrates a reduced $$\frac{n_{sp}}{c}$$

which is the specific viscosity divided by concentration. This reduction in the $$\frac{n_{sp}}{c}$$

is indicative of a reduction in the average chain length of the polymers in accordance with known polymer chemistry.

While there is some variation possible in the hydrolysis conditions as pointed out above, these hydrolysis conditions in general produce similar types of products. The following table will show the variation in the dispersibility of the gluten with variations in the time of heating at a fixed calcium oxide concentration and at a fixed temperature.

TABLE I

*Degree of hydrolysis of wheat gluten with respect to time*

[3% CaO and 150° C.]

| Min. of Heating at 150° C. | Gluten Dispersed as Per cent of Original Gluten |
|---|---|
| 15 | 80 |
| 20 | 83 |
| 25 | 85 |
| 30 | 86 |

The effect of variation in time of hydrolysis upon the nitrogen distribution and on $$\frac{n_{sp}}{c}$$

is shown by the following table:

TABLE II

*Characteristics of gluten hydrolyzed at 150° C. using CaO as 3% of dry gluten weight for various time periods*

| Time of Hydrolysis Min. | Nitrogen Distribution as Per cent of Total Nitrogen | | | Specific Viscosity Concentration |
|---|---|---|---|---|
| | Amino | Ammonium | Amide | |
| 30 | 2.04 | 2.14 | 20.21 | .1004 |
| 45 | 2.90 | 2.47 | 19.41 | .0756 |
| 60 | 2.58 | 2.74 | 19.51 | .0762 |

The effect of variations in calcium oxide concentration upon nitrogen distribution and on $$\frac{n_{sp}}{c}$$

is shown by the following table:

TABLE III

*Characteristics of gluten hydrolyzed for 30 min. at 150° C. in presence of varying quantities of calcium oxide*

| CaO as Per Cent of Dry Gluten | Nitrogen Distribution as Per Cent of Total Nitrogen | | | Specific Viscosity Concentration |
|---|---|---|---|---|
| | Amino | Ammonium | Amide | |
| 2.0 | 1.58 | 1.04 | 21.62 | .1150 |
| 3.0 | 2.14 | 0.60 | 20.39 | .0897 |
| 4.0 | 2.31 | 0.84 | 19.54 | .0773 |
| 5.0 | 2.86 | 0.47 | 19.05 | .0689 |

The products of the present invention are all very soluble and moreover, demonstrate gluten solubility over the entire pH range, having a minimum solubility of around pH 4-5. The following table will show the dispersibility of the various lime hydrolyzed glutens with variations both in the amount of lime used for the hydrolysis, as well as variations in the pH of the aqueous solution in which the hydrolyzed glutens are dispersed:

TABLE IV

*Dispersibility of CaO hydrolyzed gluten vs. pH*

[Gluten hydrolyzed 30 min. at 150° C.]

| pH | Nitrogen Dispersed as Per Cent Total Nitrogen— | | |
|---|---|---|---|
| | 3% CaO | 4% CaO | 5% CaO |
| 2.0 | 97.0 | 98.5 | 97.0 |
| 3.0 | 97.0 | 96.3 | 92.5 |
| 4.0 | 66.5 | 70.0 | 75.0 |
| 5.0 | 64.0 | 70.5 | 83.5 |
| 6.0 | 81.0 | 99.0 | 97.0 |
| 7.0 | 95.5 | 99.0 | 99.5 |
| 8.0 | 97.0 | 99.0 | 99.5 |
| 9.0 | 97.0 | 99.0 | 99.5 |

This table shows that even at the point of least solubility of around pH 4-5, there is a solubility of from 60-75%. At a pH of 7 or higher, and at a pH of 3 or lower the materials are almost completely soluble. The high degree of solubility at a neutral pH is of considerable interest and value for commercial uses where neutral solutions are desired. Moreover, the high solubility in the acid range may be of value where acidified adhesives are used on metal foils.

As was pointed out previously the products of the present invention demonstrate good solubility in such organic solvents as aqueous ethanol and in aqueous ethylene glycol monomethyl ether. The following table demonstrates the solubility of gluten which was hydrolyzed with 3% calcium oxide at 150° C. for 30 minutes, with variation in the pH of the aqueous ethanol as well as variations in the concentration of the ethanol.

TABLE V

*Dispersibility of CaO hydrolyzed gluten in aqueous ethanol*

| Ethanol Conc. Per Cent By Weight | Nitrogen Dispersed as Per Cent of Total Nitrogen | |
|---|---|---|
| | pH6 | pH8 |
| 50 | 96.0 | 94.8 |
| 50 | 96.6 | 92.8 |
| 70 | 78.5 | 52.0 |
| 80 | 21.2 | 23.9 |
| 90 | 2.3 | 22.0 |

The alcohol dispersibility of the modified gluten makes the material well suited for application to oily surfaces. The presence of the alcohol permits the oil film to be displaced and the protein adhesive to contact the bare surface. Not only is the original modified gluten dispersible in aqueous alcohol, but also gummed tapes or labels may be remoistened by the aqueous ethanol.

The adhesive qualities of calcium oxide hydrolyzed glutens were tested in the following manner: Gluten was hydrolyzed for 30 minutes at 150° C. in the presence of 2%, 3%, 4% and 5% calcium oxide. Since there exists no general adhesive test giving numerical values acceptable to various industries, a relative test of the various calcium oxide hydrolyzed glutens was carried out as follows: Strips of 90# kraft paper were coated with 10% aqueous solution (pH 7) of the various CaO gluten preparations. After drying, the strips were cut to a width of 0.5 inch. One strip was immersed in water for 2-3 seconds, then placed on a dry strip so that the coated surfaces overlapped 0.5 inch. The resulting bond was allowed to dry under a constant weight. The strips were then held at one end by a stationary clamp while an empty container was fastened to the other end. Into this container there was poured lead shot until the weight caused either the paper or bond to rupture. The results of these tests are presented in the following table:

TABLE VI

*Bond strengths of calcium oxide gluten, casein, and animal glue*

| Protein | CaO as Per Cent of Gluten | $\frac{n_{sp}}{c}$ | Strength of ½" x ½" Bond |
|---|---|---|---|
| CaO Gluten | 2 | .1150 | All bonds were stronger than the 90# kraft paper which ruptured at a pull of 6200 gm. (14.3 lbs.) on a 0.5 inch strip. |
| CaO Gluten | 3 | .0897 | |
| CaO Gluten | 4 | .0773 | |
| CaO Gluten | 5 | .0689 | |
| Casein | | | |
| Animal Glue (200 Bloom) | | | |

Since the paper ruptured in all instances the lime hydrolyzed gluten preparations were certainly the equal of the other proteins in this application.

The lime hydrolyzed gluten had the advantage of being applied from cold aqueous solutions as compared with the aqueous ammonium hydroxide dispersion of the casein and the hot solution of the glue.

With the 4% and 5% calcium oxide hydrolyzed glutens there was a tendency for these glutens in the 10% concentration to be absorbed by the paper necessitating the application of a second coating in order to avoid a "starved joint." This tendency for the solution of the calcium oxide gluten to be absorbed by the paper was not encountered in the 2% and 3% calcium oxide hydrolyzed gluten preparations. This tendency for the solution of the hydrolyzed gluten to be absorbed can be correlated with the viscosity. Thus apparently an $$\frac{n_{sp}}{c}$$

in excess of 0.08 is required in order to avoid undue absorption of the gluten by the paper. Hydrolyzed gluten having an $$\frac{n_{sp}}{c}$$

of less than .08 is capable of use in strengthening the paper itself.

Blocking tests were run on plasticized and non-plasticized lime hydrolyzed gluten coatings, and it was found that the non-plasticized gluten coatings demonstrated no tendency toward blocking. It was also found that ethylene glycol monobutyl ether (butyl Cellosolve) and that sorbitan monolaurate polyoxyalkylene derivative (Tween 20) could be used as plasticizers for calcium oxide hydrolyzed gluten coatings. These tests were run by preparing a 50% dispersion of the lime hydrolyzed gluten in water and adjusting the pH to 7. The plasticizers were added and the solution spread on 90# kraft tape. Thereafter they were dried and the blocking tests were run according to the A. S. T. M. standard at 75% relative humidity and at a temperature of 37–38° C. The plasticizers were employed in a concentration of 10% based on the weight of the protein.

These protein products were also tried as protective colloids for natural and synthetic rubber latices. Natural rubber latex is quite unstable to mechanical agitation. For this reason some protective colloid, such as casein, is usually used to stabilize the latex so that it may be handled by pumps without coagulation. A comparison was made of the effect of lime hydrolyzed gluten and casein upon the stability of the rubber latex. When both proteins were made into 5% dispersions and added to the rubber latex in concentrations of 0.1–2.0% of the dry rubber solids, the lime hydrolyzed gluten was found to stabilize the latex for longer periods of time than the casein.

It was also observed that a 15% solids casein solution was about as high a concentration as could be added to the latex and still obtain good mixing prior to the agitation test. In contrast, a 50% solution of lime hydrolyzed gluten could be added to the latex and good mixing obtained for the agitation test. A comparison of the 15% casein with the 50% lime hydrolyzed gluten showed the latter to be able to stabilize a latex for a period 6.3 times as long as that provided by casein, and when a 5% casein solution was used the 50% lime hydrolyzed gluten was 1.9 times as effective as the casein. In addition to the advantage of improved stabilization, the lime hydrolyzed gluten may be added in a highly concentrated solution, which means that the rubber latex does not have to be diluted as much as when casein is employed for this purpose.

It has also been found that the lime hydrolyzed gluten of the present invention is as effective as casein for stabilizing synthetic latices in starch-clay coating compositions. In this application it again enjoys the property of ready solubility to high solids content solutions in cold water. These high solids content solutions may be added directly to the synthetic latices with only slight increase in viscosity. In contrast to these properties, casein can be used only for the production of relatively low concentration solutions and these solutions tend to unduly increase the viscosity of the synthetic latices.

As to all of these applications, the lime hydrolyzed gluten also possesses the advantage of being highly resistant to putrefaction, whereas casein readily putrefies when allowed to stand in an aqueous solution for any reasonable length of time.

Another advantage of the present invention is the fact that the present process of partially hydrolyzing gluten effects an almost complete removal of fat from the gluten. Wheat gluten commercially available on the market may contain several percent of fat which has accompanied the gluten from the flour from which the gluten is separated. In some operations this fat may be undesirable. In one experiment two identical samples of gluten were hydrolyzed at 150° C. for 30 minutes, one in the presence of 1% calcium oxide and the other in the presence of 3% of calcium oxide. After the hydrolysis it was found that the sample hydrolyzed with 1% calcium oxide contained 5.9% of fat based on the weight of the dispersed product, whereas the other sample contained only 0.4% of fat. The fat in the process is apparently hydrolyzed to the free fatty acids which then combine with the calcium to form calcium soaps which may be filtered off or centrifuged off. These soaps may then be used to work up free fatty acids. At the same time, the removal of the soaps results in an excellent protein product.

The following examples will serve to illustrate the invention:

EXAMPLE 1

Six hundred grams of freshly washed gluten was placed in a mixer. While being agitated, 6.3 g. of 95% CaO was intimately mixed with the gluten until a homogeneous mass was obtained. This required about 5 minutes. There was then added slowly over a period of 15 minutes, a total of 390 g. of water, and mixing was continued until a homogeneous fluid mass was obtained. This last mixing period required approximately 10–15 minutes. The resulting mixture had the following composition:

Gluten _____ 20%
CaO _____ 3% of dry gluten weight

The fluid alkaline gluten (pH 12.4) was introduced into a stainless steel bomb, then autoclaved at 70# steam pressure for 30 minutes. At the end of the heating period the bomb was immediately chilled in water. To the contents of the bomb there was added 0.9 g. of ammonium carbonate to precipitate the excess soluble calcium ions, and then the whole was centrifuged. The supernatant was decanted and the non-dispersed residue washed twice with 100 cc. portions of water. After centrifuging each wash, the wash water was combined with the supernatant. The whole was then filtered through filter paper pulp and filter aid on a Buchner funnel. The resulting clear tan-colored filtrate was drum dried at 60-85# steam pressure.

EXAMPLE 2

Calcium oxide equal to 3% of the dry weight of gluten (1% wet weight) was added and the material mixed until a smooth homogeneous mass was obtained. Sufficient water was slowly added to lower the protein concentration to 20%. During the addition of water, agitation was continued so that a lump-free homogeneous mass was obtained. This fluid alkaline gluten was then introduced into an autoclave fitted with a stirrer and the gluten was hydrolyzed at 70# steam pressure for 30 minutes. The hydrolysate was then blown off into a holding tank. The hot hydrolysate after being passed through a water-cooled coil was mixed with a solution of ammonium carbonate. The material was then passed through a solid bowl centrifuge which removed the precipitated residue. The centrifugate containing approximately 15-20% solids was concentrated in a vacuum evaporator to 45% solids concentration. The resulting viscous sirup was then dried on a drum drier at 60# steam pressure.

In large scale operations carbon dioxide may be used in place of the ammonium carbonate to precipitate excess calcium. Ammonium carbonate, however, is convenient for small size operations. In the preparation of an adhesive from lime hydrolyzed gluten prepared from a fat-free or low fat gluten, it is unnecessary to remove precipitated material, and it is possible to simply dry the hydrolysate. Where the gluten employed contains a large amount of fat it is preferred to remove at least part of the precipitated calcium soaps and calcium carbonate. In the preparation of a high quality protein, however, such as is used in the stabilization of natural and synthetic latices, it is desirable to precipitate the excess calcium and to remove it either by filtration or by centrifugation.

While the invention has been described with particular reference to calcium oxide, other alkaline earth oxides such as magnesium oxide, are productive of similar results when used in the same quantities as the calcium oxide.

While various modifications of the invention have been described, it is to be understood that other variations are possible without departing from the spirit thereof.

I claim as my invention:

1. Process of modifying wheat gluten which comprises reacting wheat gluten in an aqueous medium with an alkaline earth metal oxide, the alkaline earth metal oxide being employed in a quantity of from 2-5% based on the dry weight of the gluten, heating the reaction mixture to a temperature within the approximate range of 145-155° C. for a period within the approximate range of 15-60 minutes.

2. Process of modifying wheat gluten which comprises reacting wheat gluten in an aqueous medium with lime, the lime being employed in a quantity of from 2-5% based on the dry weight of the gluten, heating the reaction mixture to a temperature within the approximate range of 145-155° C. for a period within the approximate range of 15-60 minutes.

3. Process of modifying wheat gluten which comprises reacting wheat gluten in an aqueous medium with lime, the lime being employed in a quantity of 3% based on the dry weight of the gluten, heating the reaction mixture to a temperature within the approximate range of 145-155° C. for a period of approximately 20-30 minutes.

4. Process of modifying wheat gluten which comprises reacting wheat gluten in an aqueous medium with lime, the lime being employed in a quantity of from 2-5% based on the dry weight of the gluten, heating the reaction mixture to a temperature within the approximate range of 145-155° C. for a period within the approximate range of 15-60 minutes, precipitating excess soluble calcium, and removing the precipitated calcium.

5. Process of modifying wheat gluten which comprises reacting wheat gluten in an aqueous medium with lime, the lime being employed in a quantity of from 2-5% based on the dry weight of the gluten, heating the reaction mixture to a temperature within the approximate range of 145-155° C. for a period within the approximate range of 15-60 minutes, precipitating the excess soluble calcium ions as the carbonate, and removing the precipitated calcium carbonate.

6. Process of modifying wheat gluten which comprises preparing an aqueous dispersion of gluten at about a 20% concentration and containing lime in the approximate proportion of about 3% by weight of the dry weight of the gluten, heating the aqueous dispersion to a temperature within the approximate range of 145-155° C. for a time period within the approximate range of 15-60 minutes, precipitating excess calcium as the carbonate, and removing the precipitated carbonate.

7. Process of modifying wheat gluten which comprises preparing an aqueous dispersion of gluten at about a 20% concentration and containing lime in the approximate proportion of about 3% by weight of the dry weight of the gluten, heating the aqueous dispersion to a temperature within the approximate range of 145-155° C. for a time period within the approximate range of 15-60 minutes, precipitating excess calcium as the carbonate, centrifuging the dispersion to remove precipitated calcium carbonate, and drying the centrifuged disperesion.

JOHN ROBERT COFFMAN.

REFERENCES CITED

The following references are of record in the file of this patent:

UNITED STATES PATENTS

| Number | Name | Date |
|---|---|---|
| 2,384,388 | Monte et al. | Sept. 4, 1945 |
| 2,538,898 | Cleland et al. | Jan. 23, 1951 |

FOREIGN PATENTS

| Number | Country | Date |
|---|---|---|
| 8,203 | Great Britain | 1910 |